United States Patent Office 3,661,855
Patented May 9, 1972

3,661,855
CROSS-LINKABLE ACETALDEHYDE CO-POLYMERS
Georges Ivanovsky, Verneuil-en-Halatte, France, assignor to Societe Chimiques des Charbonnages, Paris, France
No Drawing. Filed Sept. 2, 1969, Ser. No. 854,739
Claims priority, application France, Sept. 3, 1968, 164,969
Int. Cl. C08g 1/14
U.S. Cl. 260—67 R       2 Claims

ABSTRACT OF THE DISCLOSURE

Cross-linkable elastomer co-polymers of acetaldehyde with a monomer compound possessing at the same time an epoxy function fixed on two vicinal carbon atoms of a saturated hydrocarbon cycle and an epoxy function fixed on two vicinal aliphatic carbon atoms, the said co-polymers having an absorption band for infra-red at 4520 cm.$^{-1}$ which is characteristic of a free epoxy function. The method of manufacture of said elastomer co-polymers comprises the polymerization of acetaldehyde with said monomer compound by means of Lewis acid catalyst at a temperature lower than $-40°$ C.

---

The present invention relates to elastomer co-polymers of acetaldehyde with a co-polymerizable monomer compound having simultaneously an epoxy function fixed on two vicinal atoms of carbon of a saturated hydrocarbon cycle, and an epoxy function fixed on two aliphatic vicinal carbon atoms.

By the term "aliphatic carbon atoms" in the present specification there is meant carbon atoms which form part of a chain, which do not belong to a hydrocarbon cycle, and which do not comprise unsaturated bonds i.e. a paraffin hydrocarbon chain. The invention also relates to the method of manufacture of these compounds and their application to the production of cross-linked compounds.

Highly unstable acetaldehyde polymers are already known which it is possible to stabilize by the action of a solution of an alkali metal derivative, preceded, when so desired, by the action of acetic anhydride. However, these compounds have not been capable of being vulcanized up to the present time.

Thermo-plastic co-polymers of aldehydes with mono-epoxy compounds are also known which can be moulded and extruded in the form of objects and utilized in the preparation of films and coatings. These polymers are obtained by co-polymerization of monomers in the presence of a poly (hydrocarbyl aluminum oxide) catalyst. If the mono-epoxy compounds are replaced by compounds having more than one epoxy group, polymers are obtained which are cross-linked in situ. These elastomer polymers are not thermosetting in the presence of compounds generally employed for hardening epoxy resins (see U.S. Pat. No. 3,332,913).

Now, the applicants have discovered that if the acetaldehyde is polymerized in the presence of a compound possessing at least one saturated hydrocarbon cycle, an epoxy function on two carbon atoms of the cycle and an epoxy function fixed on two vicinal aliphatic carbon atoms by means of a Lewis acid catalyst at a temperature less than about $-40°$ C., elastomer co-polymers are obtained having a thermal stability greatly superior to that of the elastomer homo-polymer of acetaldehyde, and which can be cross-linked, especially by the hardening agents of epoxy resins which do not attack the poly-acetal chain in any appreciable manner, such as amines, phenols, their mixtures and the like, the amine hardening agents being the most advantageous. This cross-linking is obtained by heating to a temperature higher than 150°.

As di-epoxy compounds which comply with the above definition and which can take part in copolymerization with acetaldehyde, there may be cited the epoxy-ethyl-epoxy-cyclohexanes having the following Formula 1:

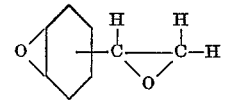

the epoxy-ethyl-epoxy-cyclo-pentanes having the following Formula 2:

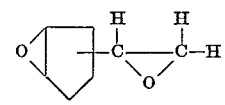

or derivatives of bicyclic compounds such as epoxy-ethyl-epoxy-bicyclo(2.2.1)heptane having the following Formula 3:

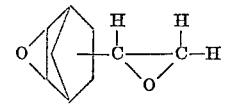

The preferred catalyst for this reaction is a co-ordination complex of boron fluoride with an organic compound in which oxygen is the donor atom, in particular an etherate of boron fluoride such as the co-ordination complex of boron fluoride with diethyl ether. It is not necessary to treat the co-polymers thus obtained with acetic anhydydride, but it is very advantageous to wash them with a solution of a carbonate, bicarbonate or hydroxide of an alkali metal. A subsequent thermal treatment enables the drying of the polymer to be completed.

The co-polymers according to the invention are characterized by the fact that they are cross-linkable; they possess an absorption band for infrared at 4520 cm.$^{-1}$ (the characteristic of a free epoxy group).

The following examples are given by way of illustration of the invention:

EXAMPLE 1

Acetaldehyde monomer is prepared in the laboratory by decomposition of paraldehyde at about 80° C., in the presence of traces of concentrated sulphuric acid. The monomer thus obtained is purified by two successive distillations in two packed columns at a slight over-pressure of nitrogen. It is distributed under static vacuum in ampullae provided with fragile joints which are then sealed so as to be stored.

From a fragile-joint ampulla containing acetaldehyde, this monomer is distributed under static vacuum by gravity into reaction ampullae provided laterally with a tube closed by a rubber diaphragm, after which they are sealed. One of these ampullae contains 17.4 grams of acetaldehyde. By means of a syringe, 2.91 grams of epoxy-ethyl-4-epoxy-1,2-cyclohexane of commercial quality are introduced through the rubber diaphragm, this compound corresponding to the formula:

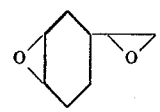

There is thus obtained a 95%-mixture by mols of acetaldehyde which is homogenized by stirring. This mixture is brought down to $-78°$ C., in a cryostat and there is injected by syringe through the rubber diaphragm 0.0105 cu. cm. of a solution of etherate of boron trifluoride diluted to 10% in anhydrous ether so as to obtain a concentration of $2 \times 10^{-5}$ mols of catalyst per mole of monomer mixture. The ampulla is violently agitated immediately. After a period of polymerization of 16 hours, there is injected a small quantity of a 50/50 mixture of pyridine/tetra-hydrofurane in excess with respect to the catalyst in order to stop the polymerization. The mixture is rapidly dissolved in an excess of tetra-hydrofurane by means of a turbo-agitator.

This solution, which does not contain any insoluble part, is precipitated by washing in a turbo-agitator, the washing liquid being renewed three times and using each time about 50 parts by weight of this liquid per part by weight of polymer.

The washing liquid is carbonated water containing 10 grams of $K_2CO_3$ per litre. The co-polymer is dried under vacuum at room temperature for 48 hours. It then weighs 7.55 grams corresponding to a yield in co-polymer of 37.2% with respect to the weight of the mixture of monomers.

A sample of this co-polymer is tested to see that it is entirely soluble in acetone. Another sample of this co-polymer is compressed between two strips of calcium chloride or INFRASIL quartz separated by a ring of 0.7 mm. in thickness. One of these strips has a width less than the diameter of the ring thus creating two hollow lateral portions which permit removal of the excess of sample without breaking the strips. There is thus obtained a co-polymer film, the fraction of the infra-red spectrum of which, between 6500 and 4450 cm.$^{-1}$, is recorded by means of the spectro-photometer PE 125.

The spectrum of the co-polymer compared with that of the poly-acetaldehyde homo-polymer possesses a band characteristic of the free epoxy groups at 4520$^{-1}$. The ratio G of the optical density of the band at 4520$^{-1}$ to the optical density of the band at 5920 cm.$^{-1}$, which is a characteristic band of polyacetaldehyde, is of the order of 0.051. This ratio G is a function of the concentration in free epoxy groups.

A quantitative determination of oxygen of the co-polymer studied gives the following values: O%=35.06; 34.64; 34.53, or an average of 34.74% which corresponds to 12% by weight or 4.11% by mols of units derived from the di-epoxy in the co-polymer.

A sample of 200 mg. of this co-polymer is subjected to a thermal treatment at 200° C. in a current of nitrogen, the loss of weight as a function of time being recorded on a thermo-balance. After four hours, the loss of weight is 2%. During the next 20 hours, the co-polymer only loses 1.5% of its weight, which corresponds to an average loss of 0.075% per hour.

EXAMPLE 2

The operation is carried out as in Example 1, but utilizing 16.4 grams of acetaldehyde and 1.338 grams of epoxy-ethyl-4-epoxy-1,2-cyclohexane, which gives a mixture of 97.5% by mols of acetaldehyde in the mixture of monomers. With a concentration of $0.5 \times 10^{-5}$ mols of catalyst per mol of mixture of monomers, there are obtained 9.10 grams of co-polymer (yield 51.3%). A sample of this co-polymer proved to be entirely soluble in acetone. The recording of the infra-red spectrum shows a weak band at 4520 cm.$^{-1}$, the ratio G of which is 0.024.

The quantitative determination of oxygen of the co-polymer gives an average value of 35.56%, which corresponds to 5.9% by weight or 1.95% by mols of units derived from di-epoxy in the co-polymer.

At 200° C. in a current of nitrogen, 200 mg. of this co-polymer lose 4.6% of their weight during the first 4 hours and 1.8% during the next 20 hours.

EXAMPLE 3

The acetaldehyde monomer is prepared as described in Example 1.

From a fragile-joint ampulla containing the acetaldehyde, this monomer is distributed by gravity under static vacuum into reaction ampullae provided laterally with a tube closed by a rubber diaphragm, after which they are sealed. One of these ampullae contains 16.3 grams of acetaldehyde. By means of a syringe there is introduced, through the rubber diaphragm, 2.73 grams of epoxy-ethyl-4-epoxy-1,2-cyclohexane. There is thus obtained a mixture with 95% by mols of acetaldehyde. This mixture is brought down to —78° C. in a cryostat and there is injected with a syringe through the rubber diaphragm, a solution of etherate of boron fluoride diluted to 10% in anhydrous ether so as to obtain a concentration of $2 \times 10^{-5}$ mol of catalyst per mol of mixture of monomer.

After a period of polymerization of 16 hours, a small quantity of a 50/50 mixture of pyridine and tetrahydrofurane is injected in excess with respect to the catalyst, in order to stop the polymerization.

The mixture is rapidly dissolved in an excess of tetra-hydrofurane by means of a turbo-agitator. This solution is precipitated by washing in a turbo-agitator, the washing liquid being renewed three times, utilizing each time about 50 parts by weight of this liquid per part by weight of polymer. The washing liquid is carbonated water containing 10 grams of $K_2CO_3$ per litre.

The co-polymer is dried under vacuum at room temperature for 48 hours. The yield in co-polymer is 30.4%. A sample of this co-polymer is subjected to a thermal treatment at 200° C. in a current of nitrogen, the loss of weight as a function of time being recorded on a thermo-balance. After 4 hours, the loss of weight is 2.3%. During the next 20 hours, the co-polymer only loses 1.2% of its weight, which corresponds to an average loss of 0.06% per hour.

This polymer is vulcanizable. It has the infra-red absorption band at 4520 cm.$^{-1}$.

EXAMPLE 4

The operation is carried out as in Example 3, but with the use of 15.25 grams of acetaldehyde, 1.245 grams of epoxy-ethyl-4-epoxy-1,2-cyclohexane and a concentration of catalyst of $0.5 \times 10^{-5}$ mol. There is obtained a polymer, with a yield of 38.8% and containing 97.5% of acetaldehyde. When heated to 200° C. in a current of nitrogen, this polymer loses 3.2% of its weight during the first four hours and 1.3% during the next 20 hours. This polymer is vulcanizable like that of the previous examples.

EXAMPLE 5

In order to study a series of subsequent cross-linking treatments of the co-polymers of the invention, there was prepared and homogenized a sample of co-polymer obtained from a series of preparations in which the method of operation was the same. The quantities of acetaldehyde employed are of the same order as in the case of the Examples 1 and 2, but the mixture of monomers has 90% of acetaldehyde in mols, and polymerization is carried out for 16 hours at —100° C. in the presence of $25 \times 10^{-5}$ mol of etherate of boron fluoride per mol of monomer mixture. A small quantity of 50/50 pyridine/acetone mixture is employed in excess with respect to the catalyst in order to stop the polymerization.

The co-polymer is dissolved in an excess of acetone by means of a turbo-agitator. This solution contains an insoluble portion fhich is separated by filtration over a Buchner of sintered glass and washed in a turbo-agitator, as for the co-polymer of Example 1. The portion which is soluble in acetone is precipitated and washed in the same way. It is the soluble portion which enables the phenomena of cross-linking to be more clearly brought into evidence. It is obvious that the same cross-linking tests could be effected on the whole of the polymer without having separated the soluble portion from the insoluble portion.

Thus, starting from three ampullae containing respectively 17.65; 16.50 and 15.70 grams of acetaldehyde, and 6.24; 5.84 and 5.55 grams of epoxy-ethyl-4-epoxy-1,2 cyclohexane, by treating these ampullae together by acetone, there are obtained 19.2 grams (yield 27.6%) of soluble portion and 7.9 grams (yield 11.4%) of insoluble portion.

When heated to 200° C. under nitrogen, samples of 200 mg. of these soluble and insoluble portions lose respectively 3.5% and 4.75% during 24 hours heating.

57.37 grams of soluble portion thus prepared by means of several series of preparations, are homogenized and purified by dissolving in acetone, using the turbo-agitator, precipitation in petroleum ether, redissolving in acetone and re-precipitation and washing with carbonated water in the turbo-agitator, further redissolving in acetone and re-precipitation and washing with carbonated water using the turbo-agitator.

After drying under vacuum at room temperature, up to constant weight, there is thus recovered 43.6 grams of co-polymer, of which a sample of 200 mg. only loses 1.5% of its weight in 24 hours heating at 200° C. under nitrogen.

The recording of the absorption spectrum with infrared light gives a very clear band at 4520 cm.$^{-1}$ (G=0.206). The quantity determination of oxygen of the copolymer gives an average value of 33.76%, which corresponds to 19.28% by weight or 6.98% by mols of units derived from di-epoxy in the copolymer.

On a sample of this co-polymer, the quantity of free epoxy groups accessible to hydrochloric acid was determined. In an Erlenmeyer of 100 cu. cm., provided at its upper part with a ground-in stopper, 300 mg. of the co-polymer are introduced. 20 cu. cm. of ethyl ether are added in order to dissolve the polymer. The vessel is closed by means of a ground-in stopper and is left for 15 hours. After dissolving, 20 cu. cm. of ether containing hydrochloric acid (~0.3 N) are poured in, when the mixture is left to rest for 1 hour.

After having added two or three drops of phenolphthalein, and a magnetized rod, the Erlenmeyer is placed on a magnetic agitator and the dosing burette is connected to the Erlenmeyer by means of a plug, in order to prevent any evaporation of HCl, $v_1$ cu. cm. of potash alcohol of known strength (0.323 N) are then poured in until the solution is neutral (changing from colourless to a persistent violet pink). It is necessary to carry out a preliminary test without polymer ($v_2$ cu. cm. of KOH). The quantity of hydrochloric acid absorbed by the polymer corresponds to ($v_2-v_1$) cu. cm. of potash. Between each test a "blank" is carried out. The number of mols of HCl absorbed per 100 grams of co-polymer gives $e_{100}$ which is thus:

$e_{100}$=Number of free epoxy mols accessible to HCl per 100 grams of co-polymer.

We have also $e_M$ percent=$e_{100} \times M$, where:

$e_M$ percent=Percentage of free epoxy mols accessible to HCl in the co-polymer;

M=Weight of 1 mol of co-polymer=44+0.96 $E_M$ percent;

$E_M$ percent=Percentage in mols of the total epoxy in the co-polymer calculated from the quantity determination of the percentage of oxygen.

There were obtained:

| $v_1$ | $v_2$ | $v_2-v_1$ | $e_{100}$ | $e_M$ percent, average |
|---|---|---|---|---|
| 28.6 cm.³ | 29.7 cm.³ | 1.1 cm.³ | 0.118 | |
| 28.8 cm.³ | 29.8 cm.³ | 1.0 cm.³ | 0.107 | 5.42 |
| 28.8 cm.³ | 29.7 cm.³ | 0.9 cm.³ | 0.097 | |

It was verified that by dosing under the same conditions polyacetaldehyde homo-polymer stabilized at its ends by acetylation followed by a thermal treatment, $v_1$ was found to be equal to $v_2$.

Of the 6.98% of mols of units corresponding to di-epoxy, 5.42 are free and accessible to HCl.

EXAMPLE 6

The operation was carried out as in Example 5, from 3 ampullae containing respectively 18.7, 16.5 and 17.4 grams of acetaldehyde and 14.88, 13.12 and 13.85 grams of epoxy-ethyl-4-epoxy-1,2-cyclohexane corresponding to an 80% mixture by mols of acetaldehyde in the mixture of monomers. With a concentration of $10 \times 10^{-5}$ mol of catalyst per mol of monomer mixture and 16 hours polymerization at —100° C., there are obtained 7.75 grams (yield 8.22%) of a portion soluble in acetone and 7.6 grams (yield 8.06%) of insoluble portion.

When heated for 24 hours at 200° C. under nitrogen, samples of 200 mg. of soluble and insoluble portions respectively lose 8.5 and 6.25% of their weight. After the same series of purifying operations by dissolving and re-precipitation, starting with 7.50 grams of co-polymer, there is obtained from this 5.67 grams, of which a sample of 200 mg. only loses 2.5% by weight in 24 hours at 200° C. under nitrogen.

The recording of the absorption spectrum with infrared light gives a strong band at 4520 cm.$^{-1}$ (G=0.680).

The quantity determination of oxygen of the co-polymer gives an average value of 30.47%, which corresponds to 43.6% by weight or 19.52% by mols of units derived from di-epoxy in the co-polymer.

The quantity determination of the free epoxy groups accessible to HCl gives:

| $v_1$ | $v_2$ | $v_1-v_2$ | $e_{100}$ | $e_M$ percent, average |
|---|---|---|---|---|
| 27.5 cm.³ | 29.7 cm.³ | 2.2 cm.³ | 0.236 | |
| 27.6 cm.³ | 29.8 cm.³ | 2.2 cm.³ | 0.236 | 14.80 |
| 27.6 cm.³ | 29.8 cm.³ | 2.2 cm.³ | 0.236 | |

Of the 19.52% of mols of units corresponding to di-epoxy, 14.80 are free and accessible to HCl.

EXAMPLES RELATING TO THE CROSS-LINKING OF CO-POLMERS

EXAMPLE 7

There is dissolved in a little acetone in a mortar, 1 gram of the co-polymer of Example 5 and 27 mg. of tri-ethylene-tetramine

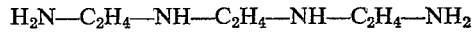

The mixture is stirred in a mortar while facilitating evaporation of the acetone by means of a current of air until a homogenous mixture of the co-polymer and the amine is obtained. The mixture is then dried under vacuum for 24 hours in order to eliminate the last traces of acetone.

500 mg. of this mixture are placed in one of the holes of a mould formed by two square aluminum plates of 2 mm. in thickness and 140 mm. side which are placed on each side of a square aluminum plate of 0.8 mm. in thickness and 140 mm. side.

The plate of 0.8 mm. is pierced with 9 holes of 25 mm. in diameter, grouped together in 3 rows of 3 holes. The edges of the holes are separated from each other and from the edge of the plate by about 16 to 16.5 mm. Before moulding, the plates are treated by a "Galac" pressure spray of Gaflon from Plastic Omnium. The moulding is carried out in air by means of a press with T°$_M$= 190° C. for a period D of 1 hour. There is thus obtained a flexible pastille of vulcanized elastomer co-polymer, as shown by:

A reduction of the free epoxy band at 4520 cm.$^{-1}$ (G=0.113 instead of 0.206 before vulcanization);

Its insolubility and its swelling by acetone.

A weight $m=0.142$ gram of this vulcanized pastille is placed in a closed Erlenmeyer of 100 cu. cm., containing 50 cu. cm. of acetone. This is left to rest for 24 hours and is then stirred slowly for 5 minutes by hand. The pastille has not been dissolved, whereas before vulcanization the co-polymer thus treated with acetone is completely dissolved. This pastille is swollen with acetone, since its weight $M=0.480$ gram after 1 minute exposure to air on the tray of the balance.

A rate of cross-linking by swelling $t_{gf}$ has been defined by the relation $$t_{gf} = \frac{m}{M}$$

In this case, we have $$t_{gf} = \frac{0.142}{0.480} = 0.296$$

In order to determine a cross-linking rate $t_{IR}$ based on measurements of absorption of infra-red light, the following operations were followed:

A calibration curve is first drawn giving in relative values the concentration of epoxy groups as a function of the value G measured on the spectrum. If 1 C is the concentration in free epoxy groups of the co-polymer of Example 5 chosen as a reference, the concentration 0.75 C, 0.5 C and 0.25 C were obtained by mixing 75, 50 and 25 parts by weight of the co-polymer of Example 5 with 25, 50 and 75 parts by weight respectively of stabilized polyacetaldehyde homo-polymer. The operation is carried out by mixing their solutions in acetone and stirring in a mortar under evaporation. The calibration curve is thus drawn by means of the following values:

Concentration of free epoxy groups, G.
```
1 C _____ 0.206
0.75 C _____ 0.137
0.50 C _____ 0.075
0.25 C _____ 0.049
0 C _____ 0
```

The pastille of vulcanized co-polymer having a value of $G=0.113$ has therefore a relative concentration in free epoxy groups of $C_r=0.66\ C$ according to the calibration curve. A cross-linking rate $t_{IR}$ based on measurements of absorption in infrared light is defined by the relation:

$$t_{IR} = \frac{C_r\ \text{before cross-linking} - C_r\ \text{after cross-linking}}{C_r\ \text{before cross-linking}}$$

which gives in this case $t_{IR} = \frac{1\ C - 0.66\ C}{1\ C} = 0.34$

EXAMPLE 8

I gram of co-polymer of Example 5 and 50 mg. of metaphenylene diamine are dissolved in dimethyl-formamide in a mortar. Metaphenylene diamine is of the formula:

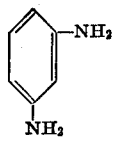

The mixture is allowed to evaporate in a current of air until the dimethyl-formamide is eliminated. The mixture is treated with a little acetone to facilitate mixing in the mortar, by rendering the medium pasty. The operation is completed by drying under vacuum for 24 hours. 400 mg. of the mixture are placed in the hole of a rectangular mould formed by two stainless steel plates of 4 mm. in thickness, 25 mm. in width and 65 mm. in length, which are fixed by four bolts of 4 mm. on each side of a rectangular aluminum plate of 0.8 mm. in thickness, 25 mm. in width and 61 mm. in length, pierced at its centre with a rectangular hole of 15 mm. by 25 mm. The four small holes for the bolts have a diameter of 4.3 mm. and are located in pairs between the small side of the plate and the central hole. The edge of these holes is at 5 mm. from the edge of the central hole and 8.8 mm. from each other for each of the pairs.

Before moulding, the plates are treated by a "Galac" pressure spray of Gaflon, from Plastic Omnium. The mould, held closed by means of its four bolts, is placed in an oven under nitrogen at $T°_M = 190°$ C. for a period D of one hour. There is thus obtained a flexible pastille of vulcanized elastomer of which $m=0.182$ gram, treated by acetone as in Example 7 and weighing $M=0.838$ gram after swelling. The cross-linking rate by swelling is thus $t_{gf}=0.217$. The spectrum gives $G=0.13$, and therefore, according to the calibration curve, a relative concentration of free epoxy groups of $C_r=0.72\ C$ from which a cross-linking rate by measurement of absorption of infrared light is obtained, $t_{IR}=0.28$.

It was verified that heating of the co-polymer of Example 5 without amine for one hour at 190° C. under nitrogen in the small rectangular mould gives a non cross-linked copolymer, since it remains soluble even if this moulding was preceded by heating for 24 hours at 200° C. under nitrogen in a scoop.

EXAMPLES 9 TO 18

The following Examples 9 to 18, for which the various factors of vulcanization have been varied, have been collected together to form a table. The operation is carried out as for Examples 7 and 8. The mixtures were all effected in a mortar following the method of operation of Example 8 when metaphenylene diamine (only slightly soluble in acetone) is employed, and that of Example 7 for the other amines and Santowhite crystal, which are soluble in acetone.

The mouldings were carried out either in air by means of the mould with 9 holes in a press (the indication "M9" will then be given in the column describing the mouldings), or in air or nitrogen by means of the small mould with one hole in an oven for all the other examples.

In the table which follows, the following abbreviations have been given for the amines and the diphenol employed:

TT—tri-ethylene tetramine

MD—metaphenylene diamine

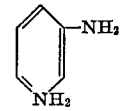

HD—Hexamethylene diamine

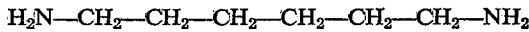

TD—Triethylene diamine

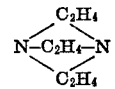

SC—Santowhite crystal or 4,4' thio-bis (3-methyl-6-tertiobutylphenol.

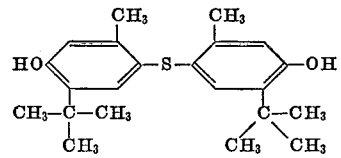

The three co-polymers of Examples 1, 2 and 5 which have been utilized are entirely soluble in acetone before cross-linking and their absorption spectrum in infrared light gives respective values of G of 0.024, 0.051 and 0.206, namely values of $C_r$ of about 0.15 C, 0.30 C and 1 C.

When mineral fillers are employed which are added to the acetone solution before evaporation while mixing in a mortar, infra-red spectroscopic measurements are hindered due to the opacity of the product obtained. The cross-linking rates must then be corrected to take account of the weight of the fillers.

If $tgf_{exp} = \dfrac{m}{M}$ $= \dfrac{\text{weight of filler} + \text{weight of co-polymer before swelling}}{\text{weight of filler} + \text{weight of co-polymer after swelling}}$ $= \dfrac{ch + cop}{ch + copgf}$ from which we have:

$t_{gf}\text{ (corrected)} = \dfrac{cop}{cop_{gf}} = \dfrac{t_{gf}\ exp}{1 + \dfrac{ch}{cop}(1 - t_{gf}\ exp)}$ which form part of a paraffin chain, selected from the group consisting of epoxy-ethyl-epoxy cyclohexanes of the formula

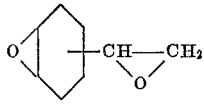

epoxy ethyl-epoxy cyclopentanes of the formula

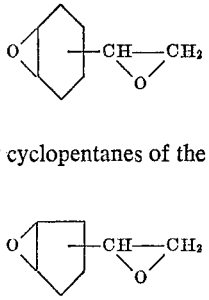

and epoxy-ethyl epoxy bicyclo (2,2,1) heptane of the formula

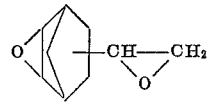

the said co-polymers having a free epoxy group and an absorption band for infra-red at 4520 cm.$^{-1}$ which is characteristic of a free epoxy function, wherein said acetaldehyde constitutes about 80 mol percent to about 97.5 mol percent of the comonomers.

| Ex. No. | Co-polymer used | | | Additives | | Moulding | | | Characteristics of the vulcanisate | | | | | |
|---|---|---|---|---|---|---|---|---|---|---|---|---|---|---|
| | Ex. | E$_M$, percent | Weight | Name | Weight | Nitrogen or air, as required, M9 | T$_M$, in °C. | D, in hours | m | M | t$_{gf}$ | G$_r$ | C', C | t$_{IR}$ |
| 9 | 5 | 6.98 | 2 | TT | 54 | N$_2$ | 190 | 0.25 | 0.102 | 0.410 | 0.249 | 0.151 | 0.80 | 0.20 |
| 10 | 5 | 6.98 | 2 | TT | 54 | N$_2$ | 180 | 1 | 0.097 | 0.378 | 0.256 | 0.123 | 0.70 | 0.30 |
| 11 | 5 | 6.98 | 2 | TT | 54 | N$_2$ | 170 | 1 | 0.093 | 0.450 | 0.207 | 0.132 | 0.73 | 0.27 |
| 12 | 2 | 1.95 | 1 | TT | 27 | Air | 190 | 1 | 0.143 | 0.950 | 0.15 | 0 | 0 | 1 |
| 13 | 1 | 4.11 | 1 | TT | 27 | N$_2$ | 190 | 1 | 0.083 | 0.140 | 0.592 | 0 | 0 | 1 |
| 14 | 5 | 6.98 | 0.5 | HD | 11.6 | N$_2$ | 190 | 1 | 0.188 | 1.644 | 0.114 | 0.178 | 0.90 | 0.10 |
| 15 | 5 | 6.98 | 1 | MD | 100 | Air | 190 | 1 | 0.090 | 0.180 | 0.50 | | | |
| 16 | 5 | 6.98 | 1 | TD | 20.7 | N$_2$ | 190 | 8 | 0.078 | 0.230 | 0.339 | 0.036 | 0.21 | 0.79 |
| 17 | 5 | 6.98 | 0.5 | SC | 71.6 | N$_2$ | 190 | 1 | 0.101 | 0.500 | 0.202 | | | |
| 18 | 5 | 6.98 | 0.5 | (¹) | (¹) | N$_2$ | 190 | 1 | 0.078 | 0.190 | 0.410 | | | |

¹ 11.2 mg. TD plus 35.8 mg. SC.

I claim:
1. A method of manufacture of cross-linkable elastomer copolymers of acetaldehyde with a co-polymerizable monomer compound possessing at the same time an epoxy function fixed on two vicinal carbon atoms of a saturated hydrocarbon cycle and an epoxy function fixed on two vicinal carbon atoms which form part of a paraffin chain, the said copolymers having a free epoxy group and an absorption band for infra-red at 4520 cm.$^{-1}$ which is characteristic of a free epoxy function, comprising the polymerization of said acetaldehyde with said co-polymerizable monomer compound by means of a Lewis acid catalyst at a temperature lower than about −40° C., said co-polymerizable monomer compound being selected from the group consisting of epoxy-ethyl-epoxy cyclohexanes, epoxy-ethyl-epoxy pentanes, and epoxy-ethyl-epoxy bicyclo (2,2,1) heptane and wherein from about 80 mol percent to about 97.5 mol percent of the comonomers is the acetaldehyde.

2. Cross-linkable elastomer co-polymers of acetaldehyde with a co-polymerizable monomer compound possessing at the same time an epoxy function fixed on two vicinal carbon atoms of a saturated hydrocarbon cycle and an epoxy function fixed on two vicinal carbon atoms

References Cited
UNITED STATES PATENTS

| | | | |
|---|---|---|---|
| 2,935,488 | 5/1960 | Phillips et al. | 260—47 EP CN |
| 3,288,758 | 11/1966 | Letort et al. | 260—67 |
| 3,332,913 | 7/1967 | Lundberg | 260—67 |
| 3,405,094 | 10/1968 | Tanaka et al. | 260—67 |

WILLIAM H. SHORT, Primary Examiner

L. M. PHYNES, Assistant Examiner

U.S. Cl. X.R.

260—32.6 R, 32.8 EP, 45.8 A, 45.9 P, 45.95, 47 EP, 830 TW